(12) United States Patent
Huang et al.

(10) Patent No.: US 10,635,874 B2
(45) Date of Patent: Apr. 28, 2020

(54) BURNING CONTROL SYSTEM AND METHOD

(71) Applicant: Goldtek Technology Co., Ltd., New Taipei (TW)

(72) Inventors: Chih-Hao Huang, New Taipei (TW); Kuo-Lin Chien, New Taipei (TW); Yen-Ching Lee, New Taipei (TW); Chih-Feng Liou, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/410,045

(22) Filed: May 13, 2019

(65) Prior Publication Data

US 2020/0089926 A1 Mar. 19, 2020

(30) Foreign Application Priority Data

Sep. 18, 2018 (TW) .............................. 107132868 A

(51) Int. Cl.
*G06K 7/14* (2006.01)
*G06F 12/0802* (2016.01)
*G06K 19/06* (2006.01)

(52) U.S. Cl.
CPC ....... *G06K 7/1413* (2013.01); *G06F 12/0802* (2013.01); *G06K 19/06028* (2013.01); *G06F 2212/16* (2013.01)

(58) Field of Classification Search
None
See application file for complete search history.

(56) References Cited

FOREIGN PATENT DOCUMENTS

| CN | 107480737 A | * | 12/2017 |
| CN | 107480737 A |   | 12/2017 |
| CN | 107894579 A |   | 4/2018  |

\* cited by examiner

*Primary Examiner* — Kristy A Haupt
(74) *Attorney, Agent, or Firm* — ScienBiziP, P.C.

(57) ABSTRACT

A burning control system includes a capturing unit, a storing unit, a controlling unit, a processing unit, and a displaying unit. The capturing unit acquires product barcode information and burned barcode information relating to printed circuit board assembly (PCBA). The storing unit can store a program file corresponding to the burned barcode information. The controlling unit obtains product barcode information and the burned barcode information and outputs the burned barcode information to the processing unit. The processing unit writes the program file to a storage chip of the PCBA board. The displaying unit can display one of several prompts for a user's information. A burning control method is also provided.

18 Claims, 3 Drawing Sheets

BURNING CONTROL SYSTEM AND METHOD

FIELD

The subject matter herein generally relates to burning control system and method.

BACKGROUND

In mobile devices or embedded systems, storage devices need to have characteristics of large capacity, light weight, small size, and shock resistance. USB hard disks and smart phone storage space are dominated by NAND flash memory. In prior art, when writing and erasing NAND flash memory, it is necessary to manually operate the specific software provided by the memory manufacturer to read, compare, and clear the target data, which is inconvenient to operate.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
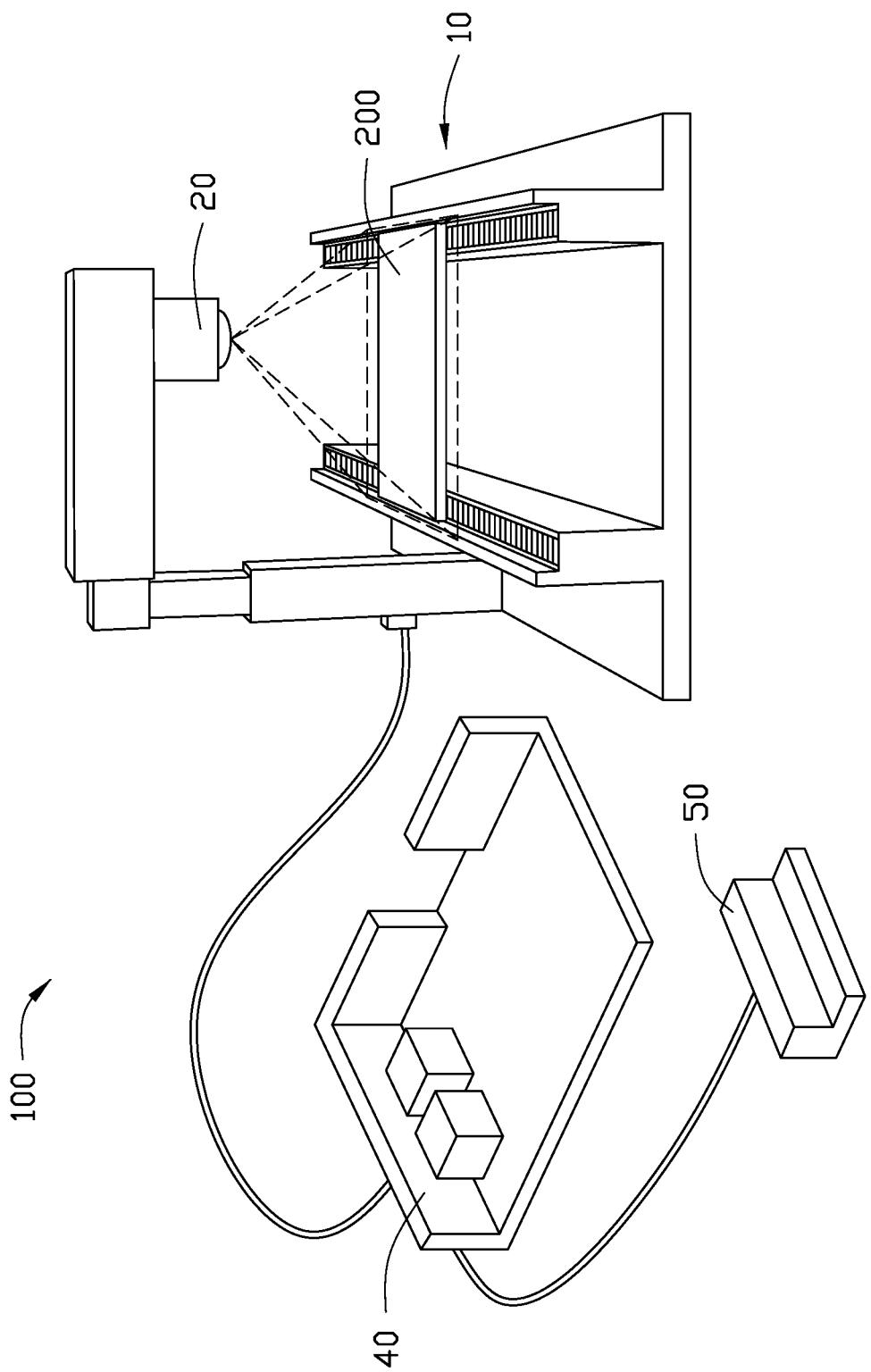
FIG. 1 is a schematic diagram of an embodiment of a burning control system, which is connected to a printed circuit board assembly (PCBA) board.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
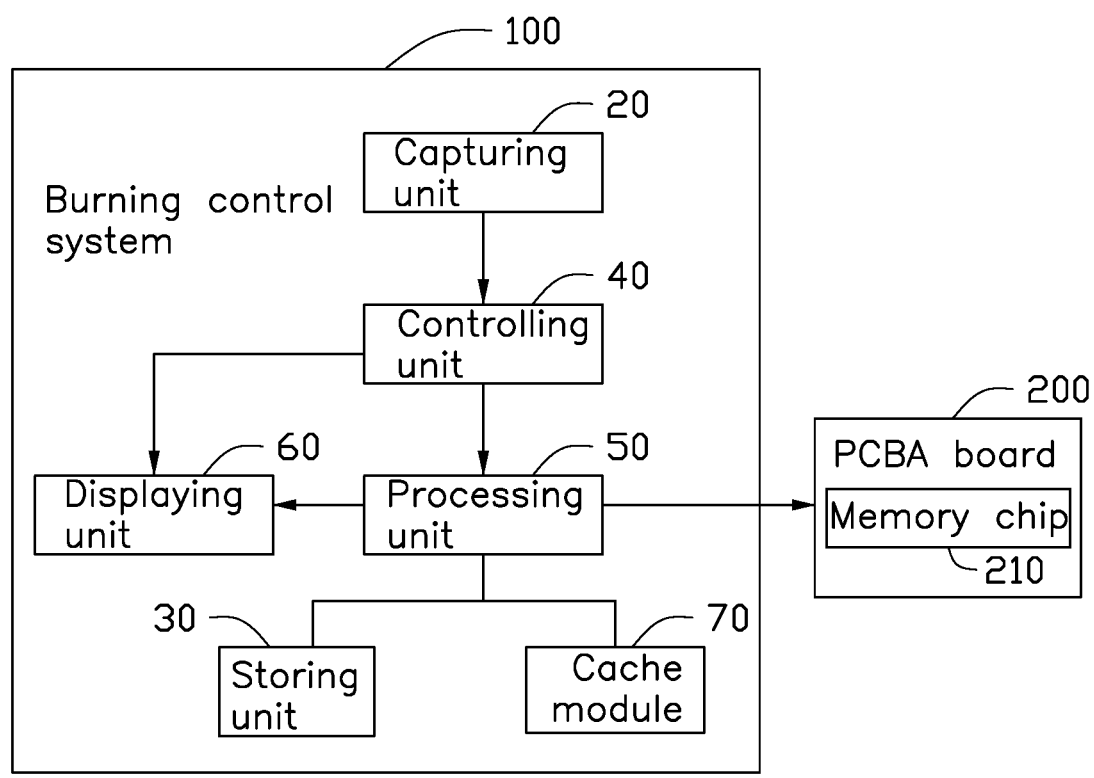
FIG. 2 is a block diagram of an embodiment of the burning control system of FIG. 1.

FIGS. 1 and 2 illustrate a burning control system 100 in accordance with an embodiment of the present disclosure.

The burning control system 100 is electrically coupled to a printed circuit board assembly (PCBA) board 200. The burning control system 100 can write or embed programs to a memory chip 210 of the PCBA board 200.

The burning control system 100 is applied to an environment of a Linux operating system to execute writing of programs on the memory chip 210.

The burning control system 100 includes a platform 10, a capturing unit 20, a storing unit 30, a controlling unit 40, a processing unit 50, and a displaying unit 60.

The platform 10 carries the PCBA board 200. The capturing unit 20 captures a barcode on the PCBA board 200 to obtain product barcode information and burn barcode information of the PCBA board 200. The capturing unit 20 uploads the product barcode information and the burn barcode information to the controlling unit 40.

The capturing unit 20 can establish a communication with the controlling unit 40 by wire or wirelessly.

For example, the barcode captured by the capturing unit 20 can include the product barcode and the burn barcode of the PCBA board 200. The product barcode is a unique identifier for each PCBA.

Each PCBA product has a digital code, and a number of bit stream codes are added after the digital code to distinguish each PCBA. Therefore, each PCBA has a unique product barcode, so that the PCBA board 200 can be assessed and analyzed for conformance to the product specifications. Each burn barcode represents version information, and the processing unit 50 records the program file corresponding to the burning barcode to the memory chip 210 by identifying the burn barcode.

The storing unit 30 stores program file corresponding to the burn barcode. For example, the storing unit 30 is a secure digital (SD) memory card storing a plurality of versions of program files. Each version of the program file corresponds to a burn barcode.

The controlling unit 40 determines whether the product barcode information is the same as a preset specification, and outputs the burn barcode information to the processing unit 50 when the product barcode information is the same as the preset specification.

For example, the controlling unit 40 compares the product barcode information with the preset specification. If the product barcode information is the same as the preset specification information, the controlling unit 40 can determine that the PCBA board 200 meets the product specifications, and the controlling unit 40 will display a first prompt (such as "PASS") through the displaying unit 60, and transmit the burn barcode information to the processing unit 50.

If the product barcode information does not meet the preset specification, the controlling unit 40 can determine that the PCBA 200 does not meet the product specifications. The controlling unit 40 can display a second prompt (such as "FAIL") through the displaying unit 60, and the burn barcode information is not transmitted to the processing unit 50.

When the processing unit 50 receives burn barcode information, the processing unit 50 clears the memory chip 210 of the PCBA board 200, and writes to the memory chip 210 the program files corresponding to the burn barcode in the storing unit 30. The program files are stored in a cache module 70.

In an embodiment, after the processing unit 50 finishes writing the program files to the memory chip 210, the processing unit 50 reads the program files in the memory chip 210, and determines whether the program files in the memory chip 210 match the program files in the cache module 70.

For example, when the processing unit 50 obtains the burn barcode, the processing unit 50 calls up the program files corresponding to the burn barcode in the storing unit 30, and writes the program files to the memory chip 210. The processing unit 50 stores the program files in the cache module 70 to enable the processing unit 50 to completely write the program files to the memory chip 210.

If the read program files are the same as the program files in the cache module 70, it is determined that the writing of the program files to the memory 210 by the processing unit 50 is successful. The processing unit 50 controls the displaying unit 60 to display the first prompt to inform the user that the program files are successfully written.

If the program files which are read are different from the program files in the cache module 70, it is determined that the writing of program files to the memory chip 210 is not successful. The processing unit 50 controls the displaying unit 60 to display the second prompt to inform the user that the writing of program files is not successful.

Figure 3:
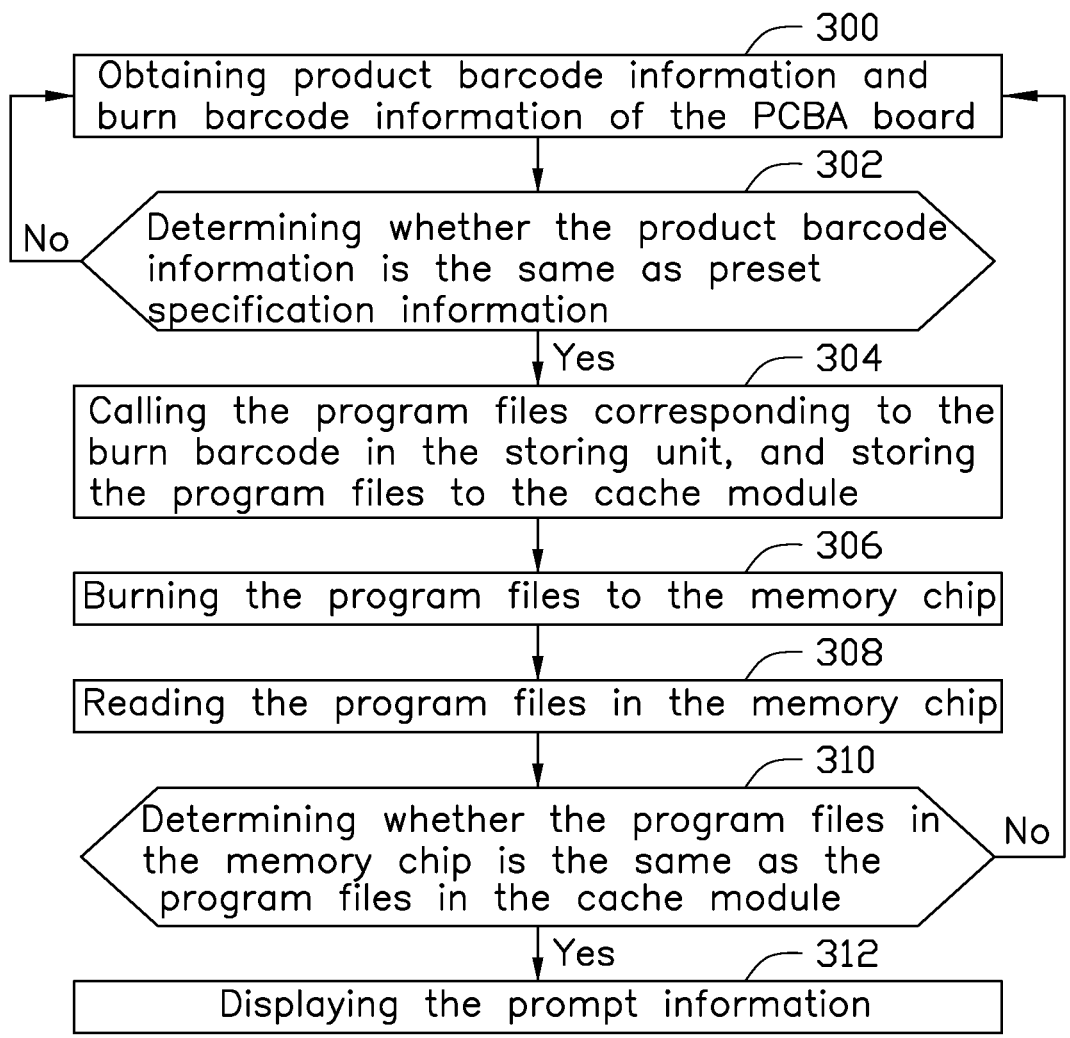
FIG. 3 is a flow diagram of an embodiment of a burning control method.

FIG. 3 is a flowchart depicting an embodiment of a burning control method. The method is provided by way of example, as there are a variety of ways to carry out the method. The method described below can be carried out using the configurations illustrated in FIGS. 1-2 for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 300.

At block 300, the capturing unit 20 captures a barcode on the PCBA board 200 to obtain product barcode information and burn barcode information of the PCBA board 200. The capturing unit 20 uploads the product barcode information and the burn barcode information to the controlling unit 40.

For example, the barcode captured by the capturing unit 20 can include the product barcode and the burn barcode of the PCBA board 200. The product barcode is a unique identifier for each PCBA board.

Each PCBA product has a digital code, and a number of bit stream codes are added after the digital code to distinguish each PCBA. Therefore, each PCBA has a unique product barcode, so that the PCBA board 200 can be assessed and analyzed for conformance to the product specifications. Each burn barcode represents version information, and the processing unit 50 records the program file corresponding to the burning barcode to the memory chip 210 by identifying the burning barcode.

At block 302, the controlling unit 40 determines whether the product barcode information is the same as a preset specification. If the product barcode information is the same as the preset specification, block 304 is implemented, otherwise returns to block 300.

At block 304, the controlling unit 40 outputs the burn barcode information to the processing unit 50. The processing unit 50 calls up the program files corresponding to the burn barcode in the storing unit 30, and stores the program files to the cache module 70.

At block 306, the processing unit 50 clears the memory chip 210 of the PCBA board 200, and writes the program files to the memory chip 210.

At block 308, the processing unit 50 reads the program files in the memory chip 210.

At block 310, the processing unit 50 determines whether the program files in the memory chip 210 are the same as the program files in the cache module 70. If the program files in the memory chip 210 are the same as the program files in the cache module 70, block 312 is implemented, otherwise returns to block 300.

At block 312, the displaying unit 60 displays the first prompt information (such as "PASS").

Therefore, the burning control system and method automatically recognizes the program code to burn the corresponding program files to the PCBA board 200, which does not require manual operation by the operator, thereby greatly improving work efficiency.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A burning control system burned program to a memory chip of a printed circuit board assembly (PCBA) board, comprising:
   a capturing unit capturing a barcode on the PCBA board to obtain product barcode information and burn barcode information of the PCBA board;
   a storing unit storing program files corresponding to burn barcode information;
   a controlling unit obtaining the product barcode information and the burn barcode information; wherein the controlling unit determines whether the product barcode information matched a preset specification, and outputs the burn barcode information when the product barcode information matched the preset specification; and
   a processing unit obtaining the burn barcode information from the controlling unit, and writing the program files to the memory chip according to the burn barcode information of the PCBA board; wherein the processing unit stores the program files in a cache module; when the program files is written to the memory chip, the processing unit reads the program files in the storing unit, and determines whether the program files in the storing unit matched the program files in the cache module, and outputs prompt information according to a comparison result.

2. The burning control system of claim 1, wherein the burning control system further comprises a displaying unit, the displaying unit displays the prompt information.

3. The burning control system of claim 2, wherein when the program files in the storing unit matches the program files in the cache module, the processing unit controls the displaying unit to display PASS.

4. The burning control system of claim 3, wherein when the program files in the storing unit does not match the program files in the cache module, the processing unit controls the displaying unit to display FAIL.

5. The burning control system of claim 1, wherein the product barcode is a unique identifier for each of the PCBA board.

6. The burning control system of claim 5, wherein the burning control system further comprises a platform, the platform is configured to carry the PCBA board.

7. The burning control system of claim 1, wherein the storing unit is a secure digital (SD) card.

8. A burning control system adapted for recoding programs to a memory chip of a printed circuit board assembly (PCBA) board, comprising:
   a capturing unit adapted for capturing a barcode on the PCBA board to obtain product barcode information and burn barcode information of the PCBA board;
   a storing unit storing program files corresponding to burn barcode information;
   a controlling unit receiving the product barcode information and the burn barcode information of the PCBA board; wherein the controlling unit determines whether the product barcode information matches a preset specification, and outputs the burn barcode information when the product barcode information matches the preset specification;
   a processing unit obtaining the burn barcode information from the controlling unit, and writing the program files to the memory chip according to the burn barcode information of the PCBA board; wherein the processing unit stores the program files in a cache module; when the program files is written to the memory chip, the processing unit reads the program files in the storing unit, and determines whether the program files in the storing unit matches the program files in the cache module, and outputs prompt information according to a comparison result; and
   a displaying unit displaying the prompt information.

9. The burning control system of claim 8, wherein when the program files in the storing unit matches the program files in the cache module, the processing unit controls the displaying unit to display PASS.

10. The burning control system of claim 9, wherein when the program files in the storing unit does not match the program files in the cache module, the processing unit controls the displaying unit to display FAIL.

11. The burning control system of claim 8, wherein the product barcode is a unique identifier for each of the PCBA board.

12. The burning control system of claim 11, wherein the burning control system further comprises a platform, the platform is configured to carry the PCBA board.

13. The burning control system of claim 8, wherein the storing unit is a secure digital (SD) card.

14. A burning control method for recording programs to a memory chip of a printed circuit board assembly (PCBA) board, comprising:
   capturing a barcode on the PCBA board to obtain product barcode information and burn barcode information of the PCBA board;
   storing program files corresponding to burn barcode information;
   obtaining the product barcode information and the burn barcode information of the PCBA board;
   determining whether the product barcode information matches a preset specification, and outputting the burn barcode information when the product barcode information matches the preset specification; and
   writing the program files to the memory chip according to the burn barcode information;
   storing the program files in a cache module;
   reading the program files when the program files is written to the memory chip;
   determining whether the program files matches the program files in the cache module, and outputting prompt information according to a comparison result.

15. The burning control method of claim 14, wherein further comprising:
   displaying the prompt information.

16. The burning control method of claim 15, wherein further comprising:
   displaying PASS when the program files matches the program files in the cache module.

17. The burning control method of claim 16, wherein further comprising:
   displaying FAIL when the program files does not match the program files in the cache module.

18. The burning control method of claim 14, wherein the product barcode is a unique identifier for each of the PCBA board.

* * * * *